United States Patent
Nakamura et al.

(10) Patent No.: US 10,179,610 B2
(45) Date of Patent: Jan. 15, 2019

(54) FRONT VEHICLE-BODY STRUCTURE OF VEHICLE

(71) Applicant: MAZDA MOTOR CORPORATION, Hiroshima (JP)

(72) Inventors: Takeshi Nakamura, Hiroshima (JP); Keizo Kawasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 4 days.

(21) Appl. No.: 15/386,329

(22) Filed: Dec. 21, 2016

(65) Prior Publication Data

US 2017/0203794 A1    Jul. 20, 2017

(30) Foreign Application Priority Data

Jan. 20, 2016    (JP) ................................. 2016-008989

(51) Int. Cl.
*B62D 25/08* (2006.01)
*B62D 25/02* (2006.01)
*B62D 25/04* (2006.01)

(52) U.S. Cl.
CPC ......... *B62D 25/088* (2013.01); *B62D 25/025* (2013.01); *B62D 25/04* (2013.01); *B62D 25/081* (2013.01); *B62D 25/082* (2013.01); *B60Y 2306/09* (2013.01)

(58) Field of Classification Search
CPC .... B62D 25/081; B62D 25/025; B62D 25/44; B62D 25/082; B62D 25/088

USPC ...................................................... 296/203.02
See application file for complete search history.

(56) References Cited

U.S. PATENT DOCUMENTS

| | | | | |
|---|---|---|---|---|
| 5,031,958 A * | 7/1991 | Fujita | ................... | B62D 25/082 180/89.1 |
| 5,061,009 A * | 10/1991 | Harasaki | ............. | B62D 25/081 296/192 |
| 7,140,674 B2 * | 11/2006 | Miyoshi | ................ | B62D 25/04 296/203.03 |
| 7,407,220 B2 * | 8/2008 | Kanagawa | ........... | B62D 25/088 296/187.09 |
| 9,321,488 B2 * | 4/2016 | Kawachi | ................ | B62D 25/04 |
| 9,914,482 B2 * | 3/2018 | Hirata | ................... | B62D 25/04 |

FOREIGN PATENT DOCUMENTS

JP          2007-131028 A        5/2007

* cited by examiner

*Primary Examiner* — Pinel E Romain
(74) *Attorney, Agent, or Firm* — Studebaker & Brackett PC

(57) ABSTRACT

A front vehicle-body structure of a vehicle comprises a hinge pillar, an apron reinforcement, a suspension housing, a side sill, and a connecting member which connects the apron reinforcement to the hinge pillar in a brace shape and connecting the apron reinforcement to a front portion of the side sill. The connecting member includes first and second bending portions which are positioned between a rear face portion and a side face portion and between a forward flange and the side face portion, respectively, and the apron reinforcement and the side sill are continuous to each other via at least one of the first and second bending portions.

17 Claims, 10 Drawing Sheets

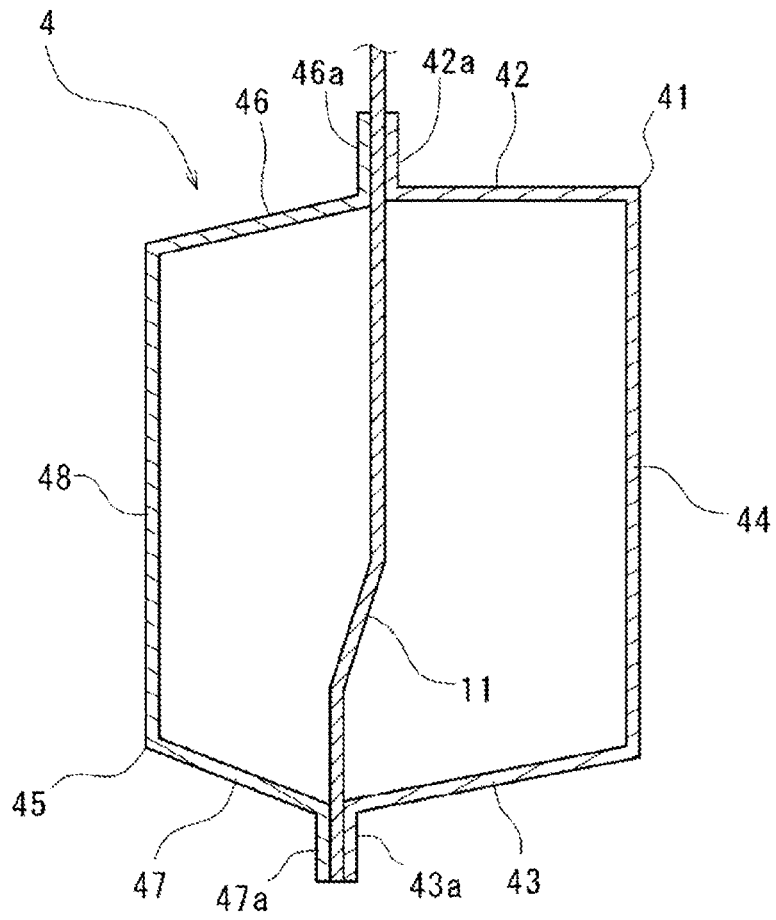
FIG. 7
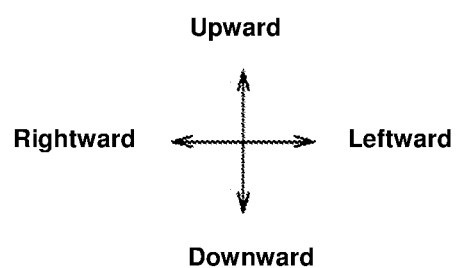

FRONT VEHICLE-BODY STRUCTURE OF VEHICLE

BACKGROUND OF THE INVENTION

The present invention relates to a front vehicle-body structure of a vehicle, and in particular, relates to a surrounding structure of an apron reinforcement to which a suspension housing is joined.

Since an upper portion of a suspension is fixedly fastened to the suspension housing, the suspension housing is easily deformed in a vertical direction by an input of vertical vibrations from the suspension. Thus, it is known that the NVH (Noise Vibration Harshness) performance is deteriorated by this deformation. Accordingly, various countermeasures for improving the rigidity of the suspension housing have been conventionally conducted in order to improve the NVH performance.

Japanese Patent Laid-Open Publication No. 2007-131028, for example, discloses a front vehicle-body structure which comprises an apron reinforcement extending forward from an upper portion of a hinge pillar, and a suspension housing provided on an inward side, in a vehicle width direction, of the apron reinforcement, wherein an inward face of the apron reinforcement and an outward face of the suspension housing are directly joined to each other, and an upper face of the apron reinforcement and the outward face of the suspension housing are joined by a joint enlargement member.

According to the above-described structure disclosed in the patent document, since an area of the joint portion between the suspension housing and the apron reinforcement is increased by a joint area of the joint enlargement member which is to be added a joint area of direct joining, a stiffer joint structure can be materialized. Thereby, the rigidity of the suspension housing is improved because the support rigidity by the apron reinforcement increases.

However, the above-described structure of the patent document is configured such that the rigidity of the suspension housing is improved by increasing the joint rigidity between the suspension housing and the apron reinforcement, thereby suppressing a relative deformation (inward falling-down, for example) of the suspension housing relative to the apron reinforcement, in particular. Therefore, in a case where the above-described vertical vibrations from the suspension is large, the suspension housing is deformed in the vertical direction and/or in the vehicle width direction together with the apron reinforcement, so that the NVH performance may be easily deteriorated.

That is, there is room for further improvement in suppressing the deformation of the apron reinforcement, in particular, the deformation, in the vertical direction, of the apron reinforcement in order to further improve the NVH performance of the vehicle.

SUMMARY OF THE INVENTION

The present invention has been devised in view of the above-described matter, and an object of the present invention is to provide a front vehicle-body structure of a vehicle, in which the suspension housing is joined to the apron reinforcement, which can improve the NVH performance by suppressing the deformation, in the vertical direction, of the apron reinforcement.

The present invention is a front vehicle-body structure of a vehicle, comprising a hinge pillar extending in a vehicle vertical direction, an apron reinforcement connected to an upper portion of the hinge pillar and extending forward, a suspension housing joined to the apron reinforcement in front of the hinge pillar, a side sill connected to a lower portion of the hinge pillar and extending rearward, and a connecting member connecting the apron reinforcement to the hinge pillar in a brace shape and connecting the apron reinforcement to a front portion of the side sill, wherein the connecting member includes a front face portion, a rear face portion, a side face portion which connects the front face and the rear face portion, and a pair of front-and-rear bending portions which are positioned between the front face portion or the rear face portion and the side face portion, respectively, and the apron reinforcement and the side sill are continuous to each other via at least one of the bending portions.

In the present invention described above, the configuration that the apron reinforcement and the side sill are continuous to each other via the bending portion includes a situation where these two members are continuous to each other via the bending portion only and another situation where these two members are continuous to each other via the bending portion and another member.

According to the present invention, since the apron reinforcement and the side sill are continuous to each other via the bending portion, the vertical load transmitted to the apron reinforcement from the suspension housing is transmitted to the side sill efficiently. In this case, the load acts on the bending portion having the high rigidity as a tensional load or a compressive load, so that the deformation, in the vertical direction, of the apron reinforcement is so easily suppressed that the rigidity, in the vertical direction, of the apron reinforcement can be improved. Consequently, the vertical deformation of the suspension housing which may be caused by the vibration input from the suspension can be suppressed, thereby improving the NVH performance of the vehicle.

In an embodiment of the present invention, the apron reinforcement is configured to have a closed cross section and a first reinforcing member is provided to longitudinally partition an inside of the closed cross section of the apron reinforcement, the hinge pillar is configured to have a closed cross section and a second reinforcing member is provided to extend obliquely forward and upward and obliquely partition an inside of said closed cross section of the hinge pillar, the side sill is configured to have a closed cross section and a third reinforcing member is provided to longitudinally partition an inside of the closed cross section of the side sill, a lower end portion of the first reinforcing member and an upper end portion of one of the bending portions are positioned so as to be continuous to each other inside and outside the apron reinforcement, a lower end portion of the above-described one of the bending portions and an upper end portion of the second reinforcing member are positioned so as to be continuous to each other inside and outside the hinge pillar, and a lower end portion of the second reinforcing member and an upper end portion of the third reinforcing member are positioned so as to be continuous to each other inside and outside the side sill.

In this embodiment, the configuration that the apron reinforcement, the hinge pillar, or the side sill has the closed cross section includes a situation where each of these members is configured to form a closed cross section alone and another situation where each of these members is configured to form a closed cross section together with any other additional member.

According to this embodiment, each sectional deformation of the apron reinforcement, the hinge pillar, and the side sill can be suppressed easily under the load acting by providing the first-third reinforcing members. Accordingly, the vertical load transmitted to the suspension housing can be transmitted to the side sill from the apron reinforcement by way of the first-third reinforcing members, reducing a transmission loss as much as possible. Further, a load transmission path can be made continuous from the upper portion of the apron reinforcement to the lower portion of the side sill by the first-third reinforcing members and the connecting member. Accordingly, the input load to the suspension housing can be transmitted from the apron reinforcement toward the side sill more efficiently.

In another embodiment of the present invention, the above-described one of the bending portions and the second reinforcing member are configured to have substantially the same angle relative to a horizontal direction in a vehicle side view.

According to this embodiment, the load transmission between the bending portion and the second reinforcing member can be attained efficiently, reducing the transmission loss as much as possible.

In another embodiment of the present invention, a front face portion of the hinge pillar includes a joint face portion to which the lower end portion of the above-described one of the bending portions and the upper end portion of the second reinforcing member are joined, and the joint face portion is configured to be substantially perpendicular to the angle of the above-described one of the bending portions and the second reinforcing member.

According to this embodiment, since the joint face portion is substantially perpendicular to the bending portion and the second reinforcing member, the joint face portion is easy to see from the vehicle forward side, and a joining tool, such as a spot-welding gun, is easy to position at the joint face portion, so that the workability of joining is superior, thereby easily improving the quality of joining.

In another embodiment of the present invention, the first reinforcing member, the second reinforcing member, and the third reinforcing member are a partitioning member, respectively.

According to this embodiment, the first-third reinforcing members can be easily made.

In another embodiment of the present invention, a fourth reinforcing member which longitudinally partitions an inside of the hinge pillar is further provided at the hinge pillar, and the fourth reinforcing member is located substantially at the same level as a lower end portion of one of the bending portions.

According to this embodiment, the load transmission path can be divided into the one which is used by the second reinforcing member and the other one which is used by the fourth reinforcing member on an anti-apron reinforcement side from the joint portion of the bending portion to the joint face portion of the hinge pillar. That is, the vertical load inputted to the apron reinforcement can be supported by the two divided parts of the load transmission path more firmly, so that the vertical deformation of the apron reinforcement can be further suppressed easily.

In another embodiment of the present invention, the fourth reinforcing member is a partitioning member.

According to this embodiment, the fourth reinforcing member can be made easily.

Other features, aspects, and advantages of the present invention will become apparent from the following description which refers to the accompanying drawings.

BRIEF DESCRIPTION OF THE DRAWINGS

FIG. 7 is a sectional view taken along line VII-VII of FIG. 2.

DETAILED DESCRIPTION OF THE INVENTION

Hereafter, embodiments of the present invention will be described referring to the accompanying drawings. In the following descriptions, while one side, in a vehicle width direction, of a front vehicle-body structure 1 of an automotive vehicle (vehicle) will be described, the present structure is configured to be symmetrical, so the other side of the front vehicle-body structure 1 is configured to be similar. Further, in the figures, unless otherwise described in particular, the terminologies of forward/rearward, inward/outward, and upward/downward directions mean a longitudinal direction, a width direction, and a vertical direction of the vehicle, respectively.

(Entire Structure of Front Vehicle-Body Structure 1)

Figure 1:
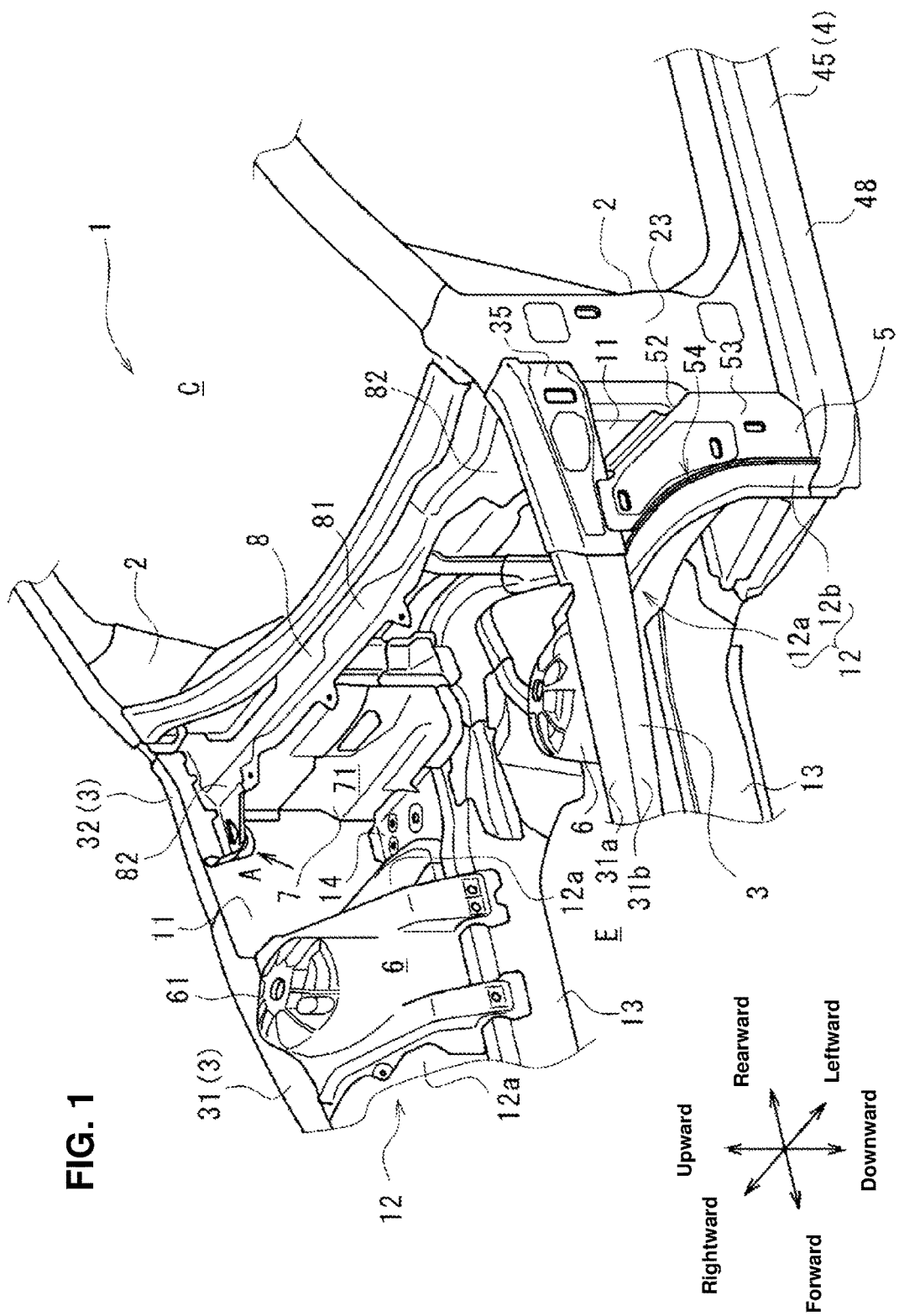
FIG. 1 is a perspective view showing a front vehicle-body structure according to an embodiment of the present invention.

FIG. 1 shows a front vehicle-body structure 1 according to an embodiment of the present invention. As shown in FIG. 1, the front vehicle-body structure 1 comprises a hinge pillar 2 which extends in the vertical direction at a front side portion of a cabin C, an apron reinforcement 3 which is connected to an upper portion of the hinge pillar 2 and extends forward, a side sill 4 which is connected to a lower portion of the hinge pillar 2 and extends rearward, and a connecting member 5 which connects the apron reinforcement 3 to the hinge pillar 2 in a brace shape and is connected to a front portion of the side sill 4. A front door (not illustrated) is pivotally supported at the hinge pillar 2.

A cowl side panel 11 which extends in the longitudinal direction is provided on an inward side, in the vehicle width direction, of the apron reinforcement 3, and an outward end portion, in the vehicle width direction, of the engine room E is partitioned by the cowl side panel 11. A wheel house 12 which accommodates a front wheel (not illustrated) is formed at a front portion of the cowl side panel 11. The wheel house 12 includes a wheel house inner 12a which is positioned on the inward side, in the vehicle width direction, of the cowl side panel 11 and a wheel house outer 12b which is positioned on the outward side, in the vehicle width direction, of the cowl side panel 11, and these members 12a, 12b are joined to a front portion of the cowl side panel 11 from both sides in the vehicle width direction.

The wheel house inner 12a is configured to protrude upward, covering the front wheel from the inward side and the upward side. The wheel house outer 12b is configured in an arc shape to cover over the front wheel. A suspension housing 6 which protrudes upward in a cylindrical shape is provided at a central portion, in the longitudinal direction, of the wheel house inner 12a. An upper portion of a front suspension (not illustrated) is fixedly fastened to an upper face portion 61 of the suspension housing 6.

Further, a side frame 13 which extends in the longitudinal direction is provided below and on the inward side, in the vehicle width direction, of the apron reinforcement 3, and the suspension housing 6 is joined to the apron reinforcement 3 and the side frame 13 at both end portions, in the vehicle width direction, thereof, extending in the vehicle width direction between these members 3, 13.

A dash panel 7 which longitudinally partitions the cabin C and the engine room E is provided in back of the suspension housing 6. A cowl top panel 8 is provided at an upper portion of the dash panel 7. The dash panel 7 and the cowl top panel 8 extend in the vehicle width direction between a pair of right-and-left cowl side panels 11, 11.

An apron rear panel 14 is provided at an area, in the vehicle width direction, between the cowl side panel 11 and the side frame 13 at a position located between, in the longitudinal direction, the suspension housing 6 and the dash panel 7. This apron rear panel 14 is configured to partition the above-described area into upper and lower sides.

Figure 2:
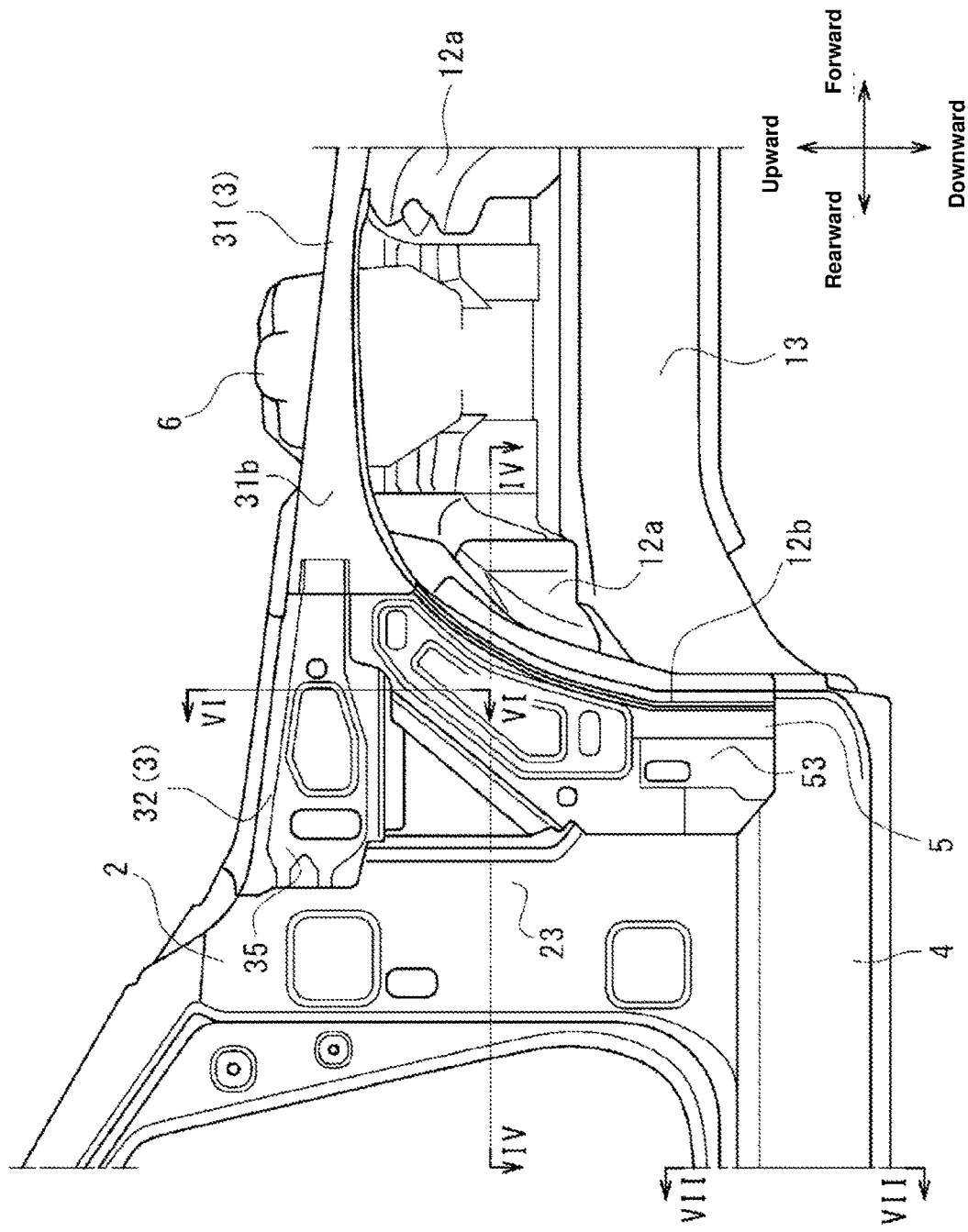
FIG. 2 is a right side view of the front vehicle-body structure of FIG. 1.
Figure 3:
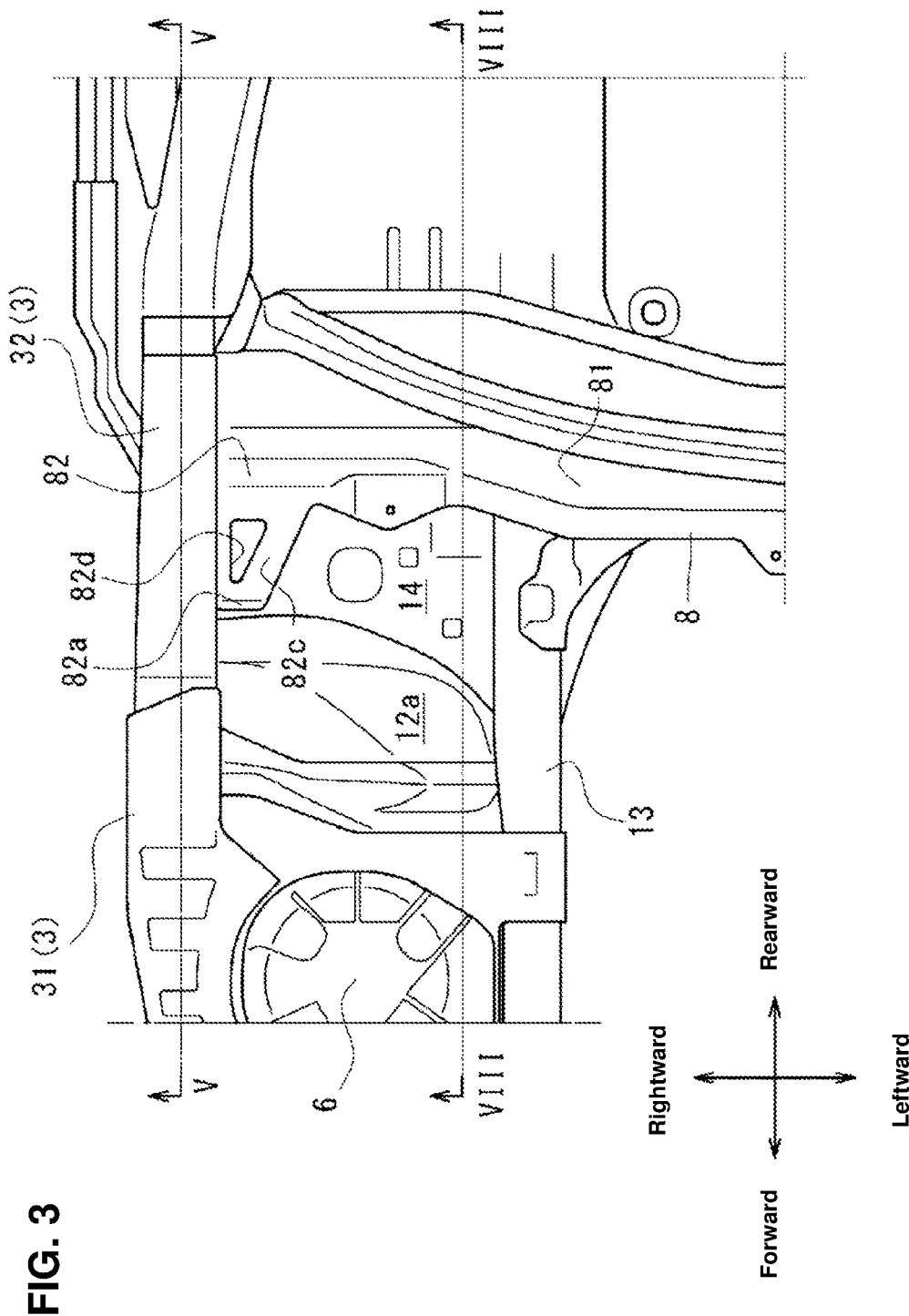
FIG. 3 is a top view of the front vehicle-body structure of FIG. 1.

Hereafter, the respective members will be described specifically. FIG. 2 is a right side view of the front vehicle-body structure 1, and FIG. 3 is a top view of the front vehicle-body structure 1. FIGS. 4-8 show sectional views at respective positions of FIGS. 2 and 3.

(Hinge Pillar 2)

Figure 4:
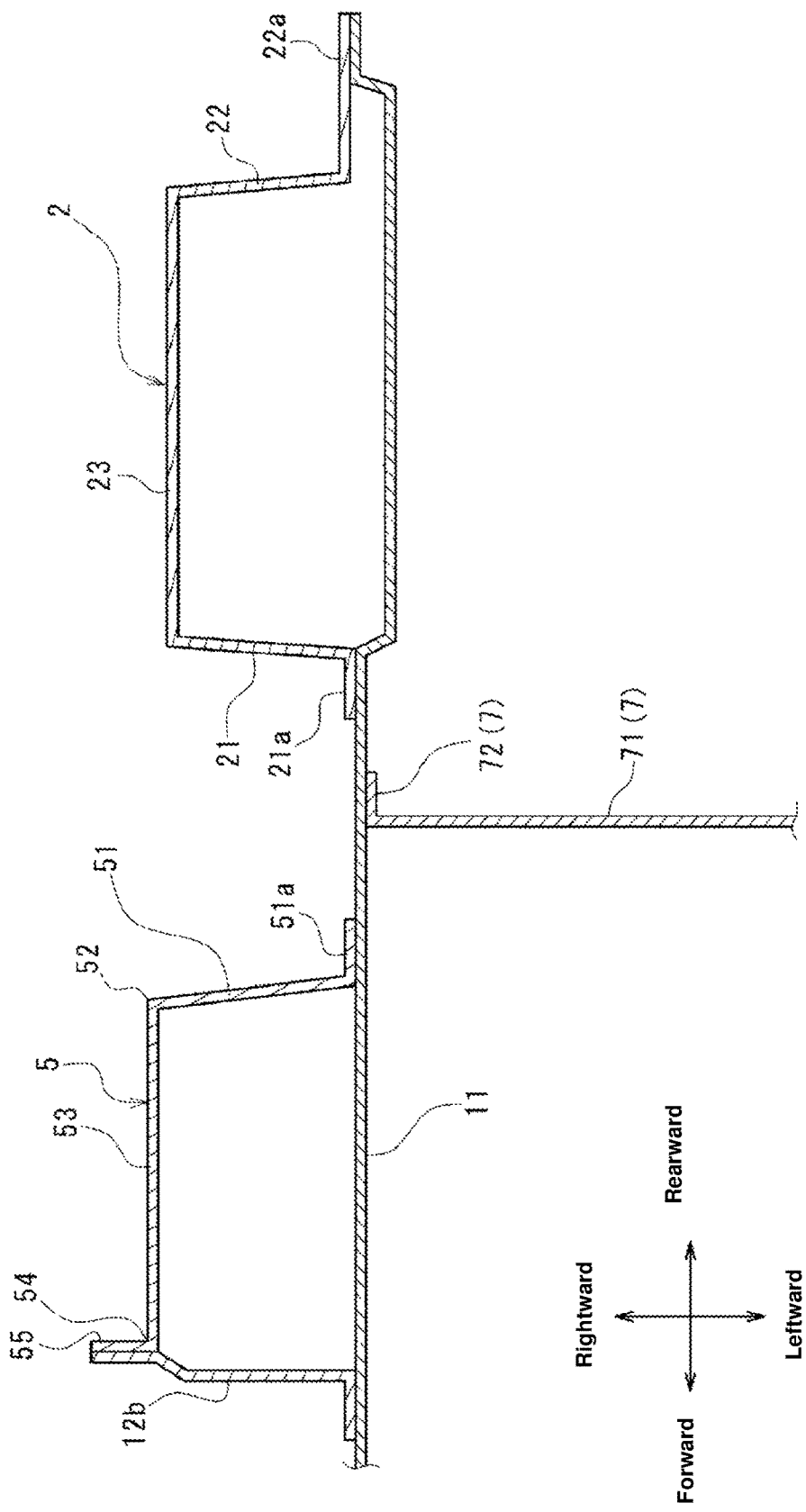
FIG. 4 is a perspective view showing a cross section taken along line IV-IV of FIG. 2.

FIG. 4 is a sectional view taken along line IV-IV of FIG. 2, which shows a horizontal sectional view of the hinge pillar 2 and the connecting member 5. As shown in FIG. 4, the hinge pillar 2 is configured to have a U-shaped cross section opening inward, and comprises a front face portion 21 and the rear face portion 22 which extend vertically, and a side face portion 23 which connects outward end portions, in the vehicle width direction, of the front face portion 21 and the rear face portion 22. At the front face portion 21 is provided a front flange 21a which extends forward from an inward end portion, in the vehicle width direction, thereof. At the rear face portion 22 is provided a rear flange 22a which extends rearward from an inward end portion, in the vehicle width direction, thereof.

The hinge pillar 2 is configured such that the front flange 21a and the rear flange 22a are joined to the cowl side panel 11 from the outward side in the vehicle width direction. That is, the hinge pillar 2 forms, together with the cowl side panel 11, a closed cross section which extends vertically.

Figure 5:
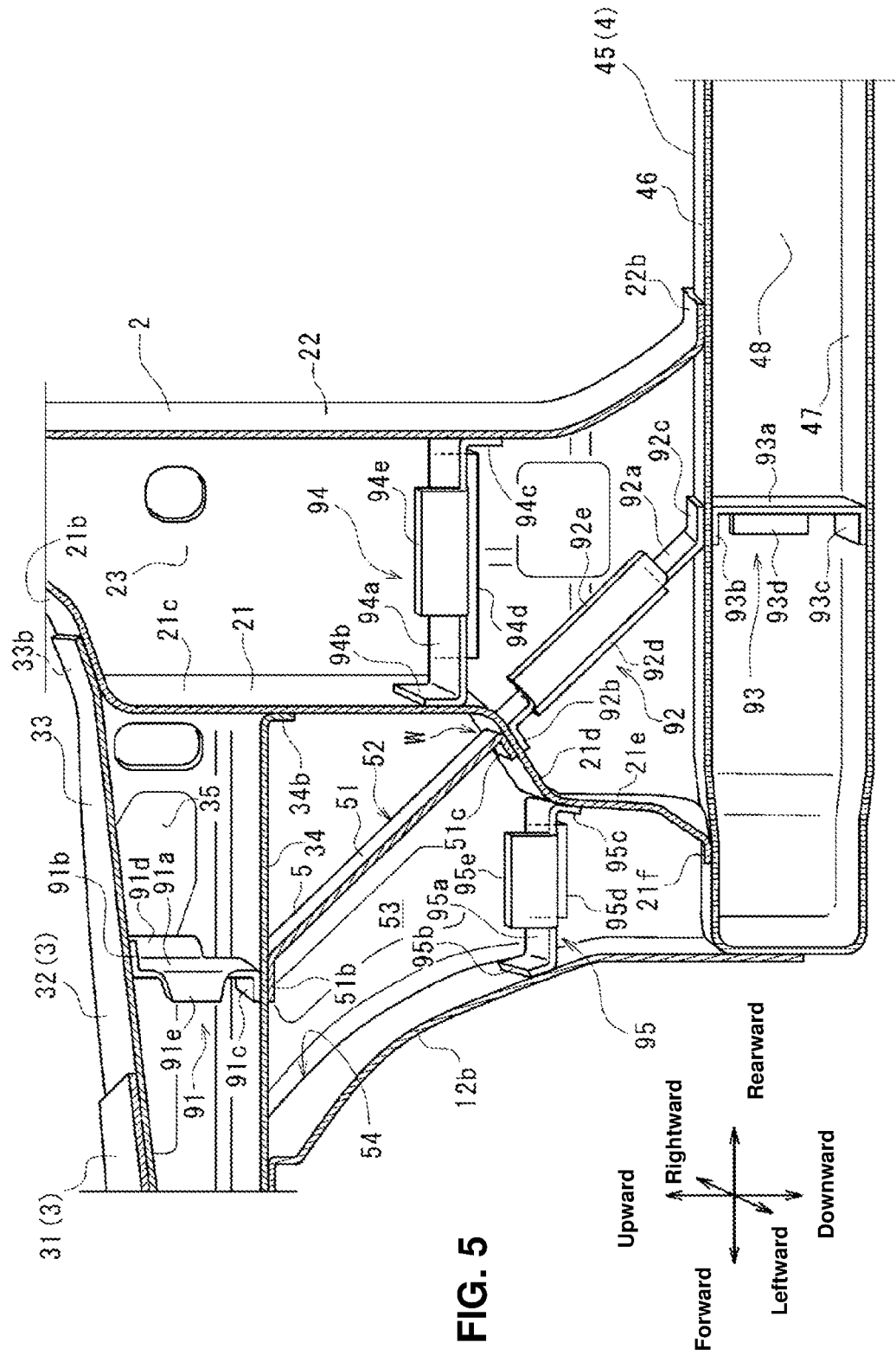
FIG. 5 is a sectional view taken along line V-V of FIG. 3.

FIG. 5 is a sectional view taken along line V-V of FIG. 3 which extends in parallel to the longitudinal direction and the vertical direction, passing on the outward side, in the vehicle width direction, of the cowl side panel 11, which is the vertical sectional view of the hinge pillar 2, the apron reinforcement 3, the side sill 4, and the connecting member 5.

As shown in FIG. 5, the front face portion 21 of the hinge pillar 2 is configured such that its front side extends forward and downward in a stepwise shape, and comprises a first step portion 21b which extends forward at an upper portion thereof, a first front face portion 21c which extends downward from a front end portion of the first step portion 21b, a second step portion 21d (a joint face portion) which extends obliquely forward and downward from a lower end portion of the first front face portion 21c, a second front face portion 21e which extends downward from a lower end portion of the second step portion 21d, and a front-face downward flange 21f which extends forward from a lower end portion of the second front face portion 21e. A rear face downward flange 22b which extends rearward is provided at a lower end portion of the rear face portion 22.

(Apron Reinforcement 3)

As shown in FIG. 1, the apron reinforcement 3 is longitudinally divided into a front apron reinforcement 31 which is positioned on the forward side and a rear apron reinforcement 32 which is positioned on the rearward side. The front apron reinforcement 31 extends longitudinally on the outward side, in the vehicle width direction, of the suspension housing 6, and the rear apron reinforcement 32 longitudinally connects the front apron reinforcement 31 and the hinge pillar 2.

The front apron reinforcement 31 comprises an upper face portion 31a which extends longitudinally and a lower face portion 31b which extends downward from an outward end portion, in the vehicle width direction, of the upper face portion 31a, which is configured to have an L-shaped cross section. The front apron reinforcement 31 is joined to a shoulder portion of the suspension housing 6 which is formed at an upper-and-outward position of the suspension housing 6, whereby a closed cross section extending longitudinally is formed between the front apron reinforcement 31 and the suspension housing 6. That is, the mainly-vertical vibration input from the front suspension (not illustrated) is efficiently transmitted to the apron reinforcement 3 having the closed cross section by way of the suspension housing 6.

Figure 6:
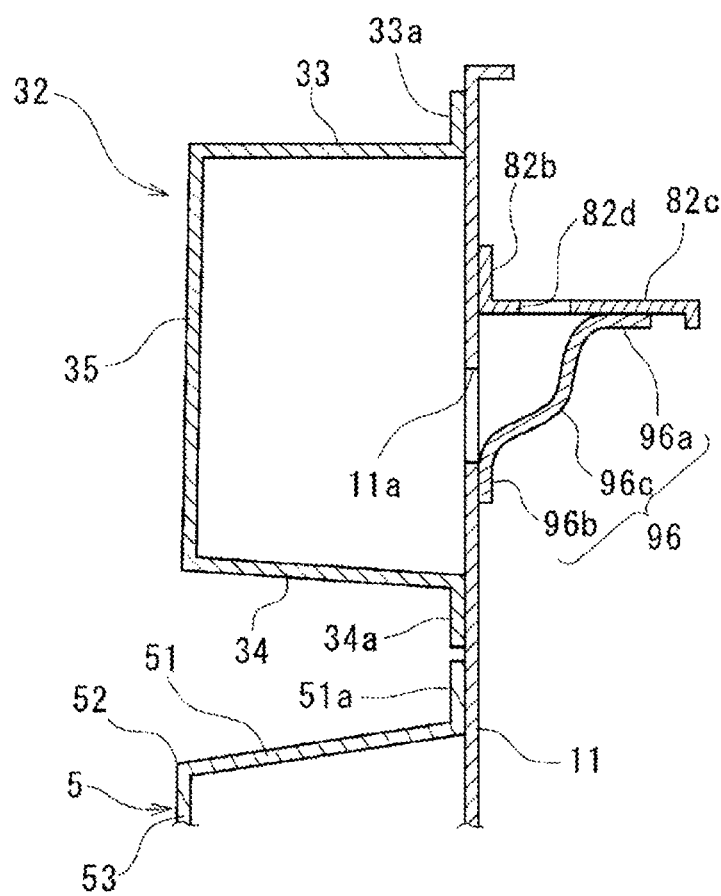
FIG. 6 is a sectional view taken along line VI-VI of FIG. 2.

FIG. 6 is a vertical sectional view of the rear apron reinforcement 32, taken long line VI-VI of FIG. 2 which extends in parallel to the vehicle width direction and the vertical direction. As shown in FIG. 6, the rear apron reinforcement 32 is configured to have a U-shaped cross section opening inward in the vehicle width direction, and comprises an upper face portion 33 and a lower face portion 34 which extend longitudinally, and a side face portion 35 which vertically connects respective outward end portions, in the vehicle width direction, of the upper face portion 33 and the lower face portion 34. At the upper face portion 33 is provided an upward flange 33a which extends upward from an inward end portion, in the vehicle width direction, thereof. At the lower face portion 34 is provided a downward flange 34a which extends downward from an inward end portion, in the vehicle width direction, thereof.

The rear apron reinforcement 32 is configured such that the upward flange 33a and the downward flange 34a are joined to the cowl side panel 11 from the outward sides, in the vehicle width direction. That is, the rear apron reinforcement 32 forms, together with the cowl side panel 11, a closed cross section which extends longitudinally.

Further, as shown in FIG. 5, the rear apron reinforcement 32 is provided with a rearward flange 34b which extends downward from a rear end portion of the lower face portion 34. The rear apron reinforcement 32 is configured such that the upper face portion 33 is joined to the first step portion 21b of the hinge pillar 2 from the upward side at its rear end portion 33b, and the rearward flange 34b is joined to the first front face portion 21c of the hinge pillar 2 from the forward side. Further, as shown in FIG. 1, the rear apron reinforcement 32 is configured such that the side face portion 35 is joined to the side face portion 23 of the hinge pillar 2 from the outward side in the vehicle width direction.

(Side Sill 4)

FIG. 7 is a vertical sectional view of the side sill 4, taken long line VII-VII of FIG. 2 which extends in parallel to the vehicle width direction and the vertical direction. As shown in FIG. 7, the side sill 4 comprises a side sill inner 41 which is positioned on the inward side, in the vehicle width direction, of the cowl side panel 11 and a side sill outer 45 which is positioned on the outward side, in the vehicle width direction, of the cowl side panel 11, which are joined to the cowl side panel 11 from both sides in the vehicle width direction.

Specifically, the side sill inner 41 is configured to have a U-shaped cross section opening outward in the vehicle width direction, and comprises an inner upper face portion 42 and an inner lower face portion 43 which extend in the longitudinal direction, and an inner side face portion 44 which vertically connects respective inward end portions, in the vehicle width direction, of these portions 42, 43. At the inner upper face portion 42 is provided an inner upward flange 42a which extends upward from an outward end portion, in the vehicle width direction, of the inner upper face portion 42. At the inner lower face portion 43 is provided an inner downward flange 43a which extends downward from an outward end portion, in the vehicle width direction, of the inner lower face portion 43.

The side sill outer 45 is configured to have a U-shaped cross section opening inward in the vehicle width direction, and comprises an outer upper face portion 46 and an outer lower face portion 47 which extend in the longitudinal direction, and an outer side face portion 48 which vertically connects respective outward end portions, in the vehicle width direction, of these portions 46, 47. At the outer upper face portion 46 is provided an outer upward flange 46a which extends upward from an inward end portion, in the vehicle width direction, of the outer upper face portion 46. At the outer lower face portion 47 is provided an outer downward flange 47a which extends downward from an inward end portion, in the vehicle width direction, of the outer lower face portion 47.

The side sill inner 41 and the side sill outer 45 are joined to the cowl side panel 11 from the both sides such that the inner upward flange 42a and the outer upward flange 46a are positioned so as to correspond to each other and also the inner downward flange 43a and the outer downward flange 47a are positioned so as to correspond to each other. Thereby, a closed cross section extending longitudinally is formed by the side sill inner 41 and the side sill outer 45. This closed cross section is divided by the cowl side panel 11 into two parts in the vehicle width direction. In other words, an inward closed cross section and an outward closed cross section, which extend longitudinally, are respectively formed between the side sill inner 41 and the cowl side panel 11 and between the side sill outer 45 and the cowl side panel 11.

Also, as shown in FIG. 5, the hinge pillar 2 is joined to the outer upper face portion 46 of the side sill outer 45 such that the front-face downward flange 21f and the rear-face downward flange 22b contact the outer upper face portion 46 from above.

(Connecting Member 5)

As shown in FIG. 1, the connecting member 5 extends obliquely rearward and downward. Referring to FIG. 4 as well, the connecting member 5 comprises a rear face portion 51 which has a specified width in the vehicle width direction and extends rearward and downward and a side face portion 53 which extends forward via a first bending portion 52 which bends forward from an outward end portion, in the vehicle width direction, of the rear face portion, which is configured to have an L-shaped cross section. A rearward flange 51a which extends rearward is provided at an inward end portion, in the vehicle width direction, of the rear face portion 51. A forward flange 55 (front face portion) which extends outward is provided at a front edge portion of the side face portion 53 via a second bending portion 54 which bends outward in an arc shape along the wheel house outer 12b.

The connecting member 5 is configured such that the rearward flange 51a is joined to the cowl side panel 11 from the outward side and the forward flange 55 is joined to an outward end portion, in the vehicle width direction, of the wheel house outer 12b from the rearward side. That is, the connecting member 5 forms, together with the cowl side panel 11 and the wheel house outer 12b, a closed cross section which extends obliquely rearward and downward.

Further, as shown in FIG. 5, at the rear face portion 51 of the connecting member 5 are provided an upward flange 51b which extends upward from an upper end portion thereof and a downward flange 51c which extends forward and downward from a lower end portion thereof. The connecting member 5 is configured such that the upward flange 51b is joined to the lower face portion 34 of the rear apron reinforcement 32 from the downward side and the downward flange 51c is joined to the second step portion 21d of the hinge pillar 2 from the forward-and-upward side. Herein, the rear face portion 51 (and the first bending portion 52) of the connecting member 5 and the second step portion 21d of the hinge pillar 2 are positioned substantially perpendicularly to each other in the vehicle side view.

Herein, as shown in FIG. 1, the connecting member 5 is configured such that an upper portion of the side face portion 53 is joined to the side face portion 35 of the rear apron reinforcement 32 from the outward side and the lower portion of the side face portion 53 is joined to the side face portion 23 of the hinge pillar 2 and the outer side face portion 48 of the side sill outer 45 of the side sill 4 from the outward side. That is, the connecting member 5 connects the rear apron reinforcement 32 and the side sill 4 continuously via the pair of front-and-rear first and second bending portions 52, 54 which are positioned at the front end portion and the rear end portion of the side face portion 53, respectively.

Specifically, as shown in FIG. 5, the connecting member 5 is configured such that the lower portion of the apron reinforcement 3 and the front portion of the side sill outer 45 are continuous to each other via the second bending portion 54 positioned on the forward side. Further, the connecting member 5 is configured such that the apron reinforcement 3 and the side sill outer 45 are continuous to each other via the first bending portion 52 positioned on the rearward side, together with first-third reinforcing members 91-93. Since the first and second bending portions 52, 54 have the high rigidity because of their bending configuration, the apron reinforcement 3 is firmly connected to the side sill 4 by the apron reinforcement 3 and the side sill 4 being continuous to each other via the bending portions 52, 54.

Hereafter, the first-third reinforcing members 91-93 will be described specifically.

(First Reinforcing Member 91)

The first reinforcing member 91 is provided inside the closed cross section formed by the apron reinforcement 3, and is provided as a partitioning member which comprises a partition wall portion 91a which extends vertically and partitions the above-described closed cross section longitudinally, an upward flange 91b which extends rearward from an upper end portion thereof, a downward flange 91c which extends forward from a lower end portion thereof, an outward flange 91d which extends rearward from an outward end portion, in the vehicle width direction, thereof, and an inward flange 91e which extends forward from an inward end portion, in the vehicle width direction, thereof.

The first reinforcing member 91 is configured such that the upward flange 91b and the downward flange 91c are joined to the upper face portion 33 and the lower face portion 34 of the rear apron reinforcement 32 from respective cross-section inward sides and also the outward flange 91d is joined to the side face portion 35 of the rear apron reinforcement 32 from its cross-section inward side. Further, the first reinforcing member 91 is configured such that the inward flange 91e is joined to the cowl side panel 11 (see FIG. 1) from its cross-section inward side.

Moreover, the first reinforcing member 91 is provided at a roughly central position, in the longitudinal direction, of the rear apron reinforcement 32, whereby the rigidity of the cross section of the rear apron reinforcement 32 is increased more effectively. Also, the first reinforcing member 91 is configured such that a lower end portion of the partition wall portion 91a and the rear face portion 51 of the connecting member 5 are continuous to each other above or below the lower face portion of the apron reinforcement 3. In other words, the first reinforcing member 91 is configured such that the partition wall portion 91a and the first bending portion 52 of the connecting member 5 are continuous to each other. Further, the downward flange 91c and the upward flange 51b are provided to face each other, interposing the lower face portion 34, and these three portions 91c, 34, 51b are joined together.

(Second Reinforcing Member 92)

The second reinforcing member 92 is provided inside the closed cross section formed by the hinge pillar 2, and is provided as another partitioning member which comprises a partition wall portion 92a which extends obliquely forward and upward and partitions the above-described closed cross section obliquely, an upward flange 92b which extends obliquely forward and downward from an upper end portion thereof, a downward flange 92c which extends rearward from a lower end portion thereof, an outward flange 92d which extends downward from an outward end portion, in the vehicle width direction, thereof, and an inward flange 92e which extends upward from an inward end portion, in the vehicle width direction, thereof.

The second reinforcing member 92 is configured such that the upward flange 92b is joined to the second step portion 21d of the hinge pillar 2 from a cross-section inward side. The partition wall portion 92a is, in the vehicle side view, configured to extend, having substantially the same angle (relative to the horizontal direction) as the rear face portion 51 of the connecting member 5 (i.e., the first bending portion 52) and also to be continuous to this rear face portion 51 via the second step portion 21d inside and outside the closed cross section formed at the hinge pillar 2.

Further, since the rear face portion 51 of the connecting member 5 and the second step portion 21d of the hinge pillar 2 are positioned substantially perpendicularly to each other as described above, the partition wall portion 92a which extends continuously to and in parallel to the rear face portion 51 of the connecting member 5 is perpendicular to the second step portion 21d as well. Consequently, the downward flange 51c of the connecting member 5 and the upward flange 92b of the second reinforcing member 92 are provided to face each other, interposing the second step portion 21d of the hinge pillar 2, so that these three portions 51c, 21d, 92b are joined together.

Further, since the rear face portion 51 and the partition wall portion 92b are perpendicular to the second step portion 21d, it is prevented that an access of a joining tool (a gun for spot welding, for example) to a joint portion W (the downward flange 51c and the upward flange 92b) is blocked by the rear face portion 51 or the partition wall portion 92b, so that joining of these portions can be easily conducted.

Further, the second reinforcing member 92 is configured such that the downward flange 92c is joined to the outer upper face portion 46 of the side sill outer 45 from the upward side. Moreover, the second reinforcing member 92 is configured such that the outward flange 92d is joined to the side face portion 23 of the hinge pillar 2 from the cross-section inward side and the inward flange 92e is joined to the cowl side panel 11 from the outward side in the vehicle width direction.

(Third Reinforcing Member 93)

The third reinforcing member 93 is provided inside the closed cross section formed between the side sill outer 45 and the cowl side panel 11. The third reinforcing member 93 is provided as another partitioning member which comprises a partition wall portion 93a which extends vertically and partitions the above-described closed cross section longitudinally and an upward flange 93b, a downward flange 93c, and an outward flange 93d which respectively extend forward from an upper end portion, a lower end portion, and an outward end portion, in the vehicle width direction, thereof.

The third reinforcing member 93 is configured such that the upward flange 93b, the downward flange 93c, and the outward flange 93d are respectively joined to the outer upper face portion 46, the outer lower face portion 47, and the outer side face portion 48 of the side sill outer 45 from the cross-section inward side.

The partition wall portion 93a is, in the vehicle side view, configured to be continuous to the partition wall portion 92a of the second reinforcing member 92 via the outer upper face portion 46 inside and outside the closed cross section formed at the side sill outer 45. Specifically, the downward flange 92c of the second reinforcing member 92 and the upward flange 93b of the third reinforcing member 93 are provided to face each other, interposing the outer upper face portion 46, so that these three portions 92c, 46, 93b are joined together. Consequently, the partition wall portion 92a and the partition wall portion 93a are configured to be continuous to each other via the outer upper face portion 46.

Thereby, the apron reinforcement 3 (the rear apron reinforcement 32) and the side sill 4 (the side sill outer 45) are firmly connected from the upper end portion to the lower end portion via the first reinforcing member 91, the rear face portion 51 of the connecting member 5 (the first bending portion 52), the second reinforcing member 92, and the third reinforcing member 93.

Further, a fourth reinforcing member 94 is provided inside the closed cross section formed at the hinge pillar 2, and a fifth reinforcing member 95 is provided inside the closed cross section formed at the connecting member 5.

(Fourth Reinforcing Member 94)

The fourth reinforcing member 94 is provided to extend horizontally between the first front face portion 21c and the rear face portion 22 of the hinge pillar 2, and provided as another partitioning member which comprises a partition wall portion 94a which partitions the closed cross section vertically, a forward flange 94b which extends upward from a front end portion thereof, a rearward flange 94c which extends downward from a rear end portion thereof, an outward flange 94d which extends downward from an outward end portion, in the vehicle width direction, thereof, and an inward flange 94e which extends upward from an inward end portion, in the vehicle width direction, thereof.

The fourth reinforcing member 94 is configured such that the forward flange 94b, the rearward flange 94c, and the outward flange 94d are respectively joined to the front face portion 21, the rear face portion 22, and the side face portion 23 of the hinge pillar 2 from the cross-section inward side. Further, the fourth reinforcing member 94 is configured such that the inward flange 94e is joined to the cowl side panel 11 from the outward side in the vehicle width direction.

Herein, the fourth reinforcing member 94 is provided closely to a lower end of the first front face portion 21c, and the forward flange 94b is positioned near the joint portion W of the downward flange 51c of the connecting member 5, the second step portion 21d of the hinge pillar 2, and the upward flange 92b of the second reinforcing member 92. Thereby, the connecting member 5 is configured such that the rear face portion 51 (and the first bending portion 52) is longitudinally supported at the fourth reinforcing member 94 at a position near the joint portion W.

(Fifth Reinforcing Member 95)

The fifth reinforcing member 95 is provided to extend horizontally between the wheel house outer 12b and the second front face portion 21e of the hinge pillar 2, and provided as another partitioning member which comprises a partition wall portion 95a which partitions the closed cross section vertically, a forward flange 95b which extends upward from a front end portion thereof, a rearward flange 95c which extends downward from a rear end portion thereof, an outward end portion 95d which extends downward from an outward end portion, in the vehicle width direction, thereof, and an inward flange 95e which extends upward from an inward end portion, in the vehicle width direction, thereof.

The fifth reinforcing member 95 is configured such that the forward flange 95b is joined to the wheel house outer 12b from the rearward side, the rearward flange 95c is joined to the second front face portion 21e of the hinge pillar 2 from the forward side. Further, the fifth reinforcing member 95 is configured such that the outward flange 95d is joined to the side face portion 53 of the connecting member 5 from the cross-section inward side and the inward flange 95e is joined to the cowl side panel 11 from the outward side in the vehicle width direction.

Herein, the fifth reinforcing member 95 is located substantially at the same level as the apron rear panel 14 (see FIG. 1) via the side face portion 53 of the connecting member 5, which is not illustrated. Thereby, the connecting member 5 is efficiently supported, in the vehicle width direction, at the apron rear panel 14 via the fifth reinforcing member 95, so that the rigidity, in the vehicle width direction, of the connecting member 5 is improved.

Next, the dash panel 7 and the cowl top panel 8 will be described.

(Dash Panel 7)

As shown in FIG. 1, the dash panel 7 comprises a dash panel body 71 which extends in the vehicle width direction between the right-and-left cowl side panels 11 and extends in the vertical direction. Referring to FIG. 4 as well, the dash panel body 71 is positioned between the suspension housing 6 and the hinge pillar 2, and more specifically positioned closely to the hinge pillar 2 in the longitudinal direction.

A pair of outward flanges 72, 72 which extend rearward (only one of them is illustrated in FIG. 4) are provided at both end portions, in the vehicle width direction, of the dash panel body 71, and the outward flange 72 is joined to the cowl side panel 11 from the inward side in the vehicle width direction.

(Cowl Top Panel 8)

As shown in FIG. 1, the cowl top panel 8 comprises a cowl top body 81 which extends in the vehicle width direction and extends in the longitudinal direction at an upper portion of the engine room E. A wiper motor (not illustrated), for example, is supported at the cowl top body 81. A pair of right-and-left cowl top joint portions 82, 82 are provided, as joint portions to the cowl side panel 11, at both side portions, in the vehicle width direction, of the cowl top body 81.

Figure 8:
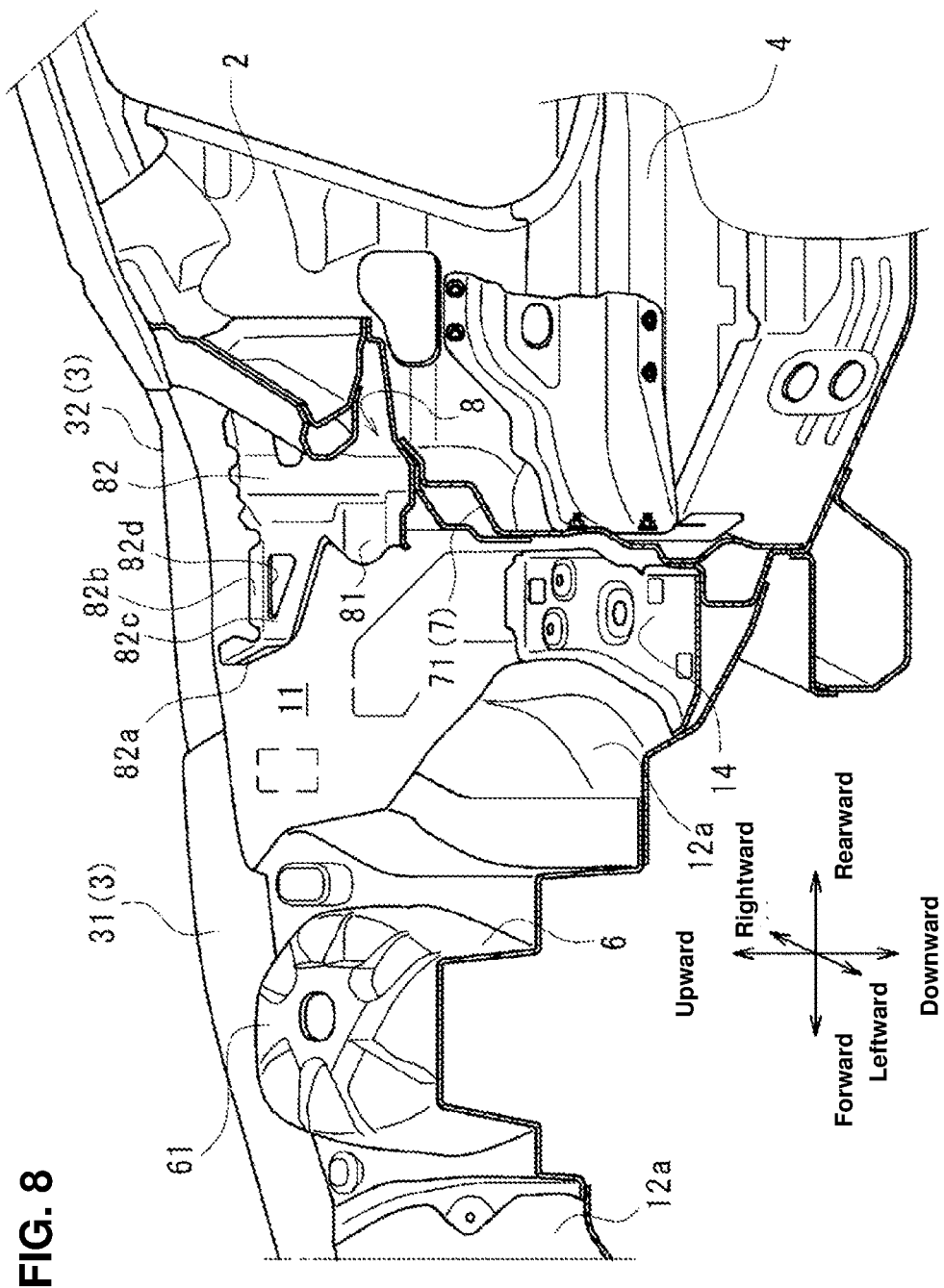
FIG. 8 is a sectional view taken along line VIII-VIII of FIG. 3.

FIG. 8 is a sectional view taken along line VIII-VIII of FIG. 3 which extends along the longitudinal direction and the vertical direction of the dash panel 7 and the cowl top panel 8. As shown in FIG. 8, the cowl top body 81 is joined to an upper edge portion of the dash panel body 71 at a roughly central position in the longitudinal direction.

The cowl top joint portion 82 is configured such that its longitudinal length is greater than the longitudinal length of the cowl top body 81, the front end portion 82a is positioned in front of the cowl top body 81, and the outward flange 82b which extends upward is provided at an outward end portion, in the vehicle width direction, thereof. Further, a step portion 82c is provided at the cowl top joint portion 82 at a position near the outward flange 82b. This step portion 82c is positioned below its surrounding portion. A cowl top opening portion 82d is formed at the step portion 82c so as to penetrate the step portion 82c vertically. The cowl top panel 8 is configured such that the outward flange 8b is joined to the cowl side panel 11 from the inward side in the vehicle width direction.

Herein, the cowl top joint portion 82 is located at the same level as the apron reinforcement 3 (the rear apron reinforcement 32). Thereby, the apron reinforcement 3 can be supported at the cowl top panel 8 from the inward side in the vehicle width direction, so that the rigidity, in the vehicle width direction, of the apron reinforcement 3 can be improved efficiently.

Figure 9:
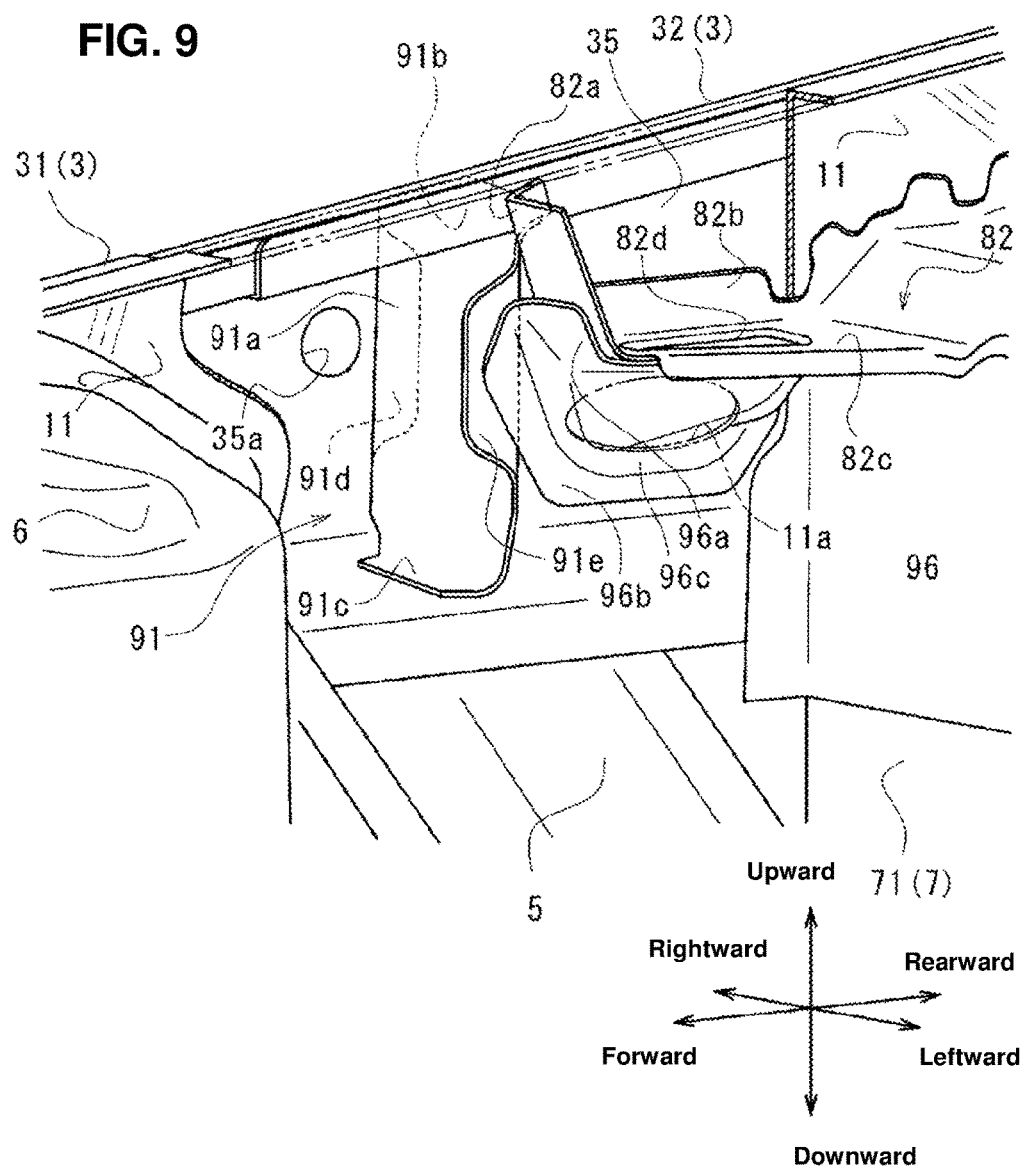
FIG. 9 is an enlarged view of FIG. 1, when viewed from a direction of an arrow A.

FIG. 9 is an enlarged view of FIG. 1, when viewed from an arrow A, which shows a surrounding portion of the right-side cowl top joint portion 82. In FIG. 9, the cowl side panel 11 is illustrated partially transparently by a broken line. As shown in FIG. 9, a brace member 96 which connects a lower portion of the cowl top joint portion 82 to the cowl side panel 11 from the inward side in the vehicle width direction is provided.

The brace member 96 comprises an upward flange 96a which extends in the vehicle width direction and is joined to the cowl top joint portion 82 from the downward side, an outward flange 96b which extends in the vertical direction and is joined to the cowl side panel 11 from the inward side in the vehicle width direction, and a brace body 96c which connects the upward flange 96a and the outward flange 96b in a bag shape. The joining rigidity of the cowl top joint portion 82 to the cowl side panel 11 can be reinforced, so that the rigidity, in the vehicle width direction, of the apron reinforcement 3 can be improved more efficiently.

Further, the outward flange 96b is provided to face the first reinforcing member 91, interposing the cowl side panel 11 in the vehicle side view. That is, the outward flange 96b overlaps the first reinforcing member 91 in the vehicle side view. Thereby, the cowl top panel 8 can support a specified portion in the closed cross section formed at the apron reinforcement 3. The specified portion is reinforced by the first reinforcing member 91 so as to have the high sectional strength. Consequently, the rigidity, in the vehicle width direction, of the apron reinforcement 3 can be improved further more efficiently.

Herein, the terminology of "overlap" which is used in the present specification means that at least a portion of one of the members and at least a portion of the other member overlap each other.

Further, a cowl side opening portion 11a is formed at the cowl side panel 11 at a position which corresponds to the brace body 96c. The cowl side opening portion 11a penetrates the cowl side panel 11 in the vehicle width direction. Thereby, rainwater or the like which flows in onto the cowl top body 81 from a space between a bonnet (engine hood) and a windshield, not illustrated, is guided to the step portion 82c which is located at a lower level, and then drained to the inside of the brace member 96, passing through the cowl top opening portion 82d.

Referring to FIG. 6 as well, the rainwater or the like drained to the brace member 96 is further drained into the closed cross section formed at the apron reinforcement 3, passing through the cowl side opening portion 11a, and then drained outside the engine room E through a drain passage, not illustrated. Thus, the rainwater or the like flowing in onto the cowl top panel 8 can be properly drained outside the engine room E, suppressing its flowing into the engine room E.

Further, as shown in FIG. 9, an opening portion 35a is formed at the side face portion 35 of the rear apron reinforcement 32. This opening portion 35a penetrates the side face portion 35 in the vehicle width direction. The opening portion 35a is provided to face the inward flange 91e of the first connecting member 91 which is provided in the closed cross section formed at the rear apron reinforcement 32.

Accordingly, even after the first connecting member 91 is joined to the upper face portion 33, the lower face portion 34, and the side face portion 35 of the rear apron reinforcement 32, the cowl side panel 11, and then the cowl side panel 11 is joined to the upward flange 33a and the downward flange 34a of the rear apron reinforcement 32, thereby forming the closed cross section, the joining tool (e.g., the spot-welding gun) can be made to have access to the inward flange 91e. Thus, the reinforcing member can be provided inside the closed cross section and also the peripheral portion of the reinforcing member can be joined to the respective wall portions of the closed cross section.

The front vehicle-body structure 1 according to the present embodiment described above provides the following effects.

Since the apron reinforcement 3 and the side sill 4 are continuous to each other via the first and second bending portions 52, 54, the vertical load transmitted to the apron reinforcement 3 from the suspension housing 6 is transmitted to the side sill 4 efficiently by way of the first and second bending portions 52, 54. In this case, since the load acts on the first and second bending portions 52, 54 having the high rigidity as a tensional load or a compressive load, these portions can be easily resist this load. Accordingly, the deformation, in the vertical direction, of the apron reinforcement 3 is so easily suppressed that the rigidity, in the vertical direction, of the apron reinforcement 3 can be improved. Consequently, the vertical deformation of the suspension housing 6 which may be caused by the vibration input from the suspension can be suppressed, thereby improving the NVH performance of the vehicle.

Since the rigidity of each of the closed cross sections formed by the apron reinforcement 3, the hinge pillar 2, and the side sill 4 can be improved by providing the first-third reinforcing members 91-93, the deformation of these cross sections can be suppressed easily under the load acting from the suspension to the suspension housing 6. Accordingly, the vertical load transmitted to the suspension housing 6 can be transmitted to the side sill 4 from the apron reinforcement 3 by way of the first-third reinforcing members 91-93, reducing a transmission loss as much as possible. Further, the load transmission path can be made continuous from the upper portion of the apron reinforcement 3 to the lower portion of the side sill 4 by the first-third reinforcing members 91-93 and the connecting member 5. Accordingly, the input load to the suspension housing 6 can be transmitted from the apron reinforcement 3 toward the side sill 4 more efficiently.

Since the rear face portion 51 (and the first bending portion 52) and the partition wall portion 92a of the second bending member 92 extend, having substantially the same angle relative to the horizontal direction in the vehicle side view, the load transmission between these can be attained efficiently, reducing the transmission loss as much as possible.

Since the second step portion 21d is perpendicular to the rear face portion 51 (and the first bending portion 52) and the second reinforcing member 92, the joint portion W where these members are joined is easy to see from the vehicle forward side, and the joining tool, such as the spot-welding gun, is easy to position at the joint portion W, so that the workability of joining is superior, thereby easily improving the quality of joining.

The load transmission path can be divided into the one extending rearward and downward which is used by the second reinforcing member 92 and the other one extending rearward which is used by the fourth reinforcing member 94 on an anti-apron reinforcement side from the joint portion W of the first bending portion 52 to the second step portion 21d of the hinge pillar 2. That is, the vertical load inputted to the apron reinforcement 3 can be supported by the two divided parts of the load transmission path more firmly, so that the vertical deformation of the apron reinforcement 3 can be further suppressed easily.

The first-fifth reinforcing members 91-95 can be made easily by forming as the partitioning member.

The rigidity, in the vehicle width direction and in the vertical direction, of the apron reinforcement 3 can be improved by forming the closed cross section of the apron reinforcement 3 (the rear apron reinforcement 32) by the cowl side panel 11 which forms the side wall, in the vehicle width direction, of the engine room E.

Further, by the first reinforcing member 91, the rigidity, in the vehicle width direction and in the vertical direction, of the apron reinforcement 3 can be improved and also the bending rigidity, in the vehicle width direction, of the cowl side panel 11 which overlaps the apron reinforcement 3. Thereby, the deformation, in the vertical direction and in the vehicle width direction, of the suspension housing 6 which may be caused by the input of the vertical load from the suspension can be effectively suppressed by the apron reinforcement 3 and the cowl side panel 11, so that the NVH performance of the vehicle can be improved.

Since the cowl side panel 11 is supported at the cowl top panel 8 in the vehicle width direction, the rigidity, in the vehicle width direction, of the cowl side panel 11 is improved.

Moreover, since the cowl side panel 11 is continuous to the apron reinforcement 3 (the rear apron reinforcement 32) via the first reinforcing member 91, the rigidity, in the vehicle width direction, of the apron reinforcement 3 is improved. Thereby, the deformation, in the vertical direction, especially in the vehicle width direction, of the suspension housing 6 (the inward falling-down, for example) which may be caused by the input of the vertical load from the suspension can be effectively suppressed by the apron reinforcement 3 and the cowl side panel 11, and the cowl top panel 8, thereby improving the NVH performance of the vehicle.

The joint rigidity of the cowl top panel 8 and the cowl side panel 11 is further improved by the brace member 96, so that the rigidity, in the vehicle width direction, of the apron reinforcement 3 and the cowl side panel 11 is further improved. Thereby, the rigidity, in the vehicle width direction, of the suspension housing 6 can be further improved, so that the NVH performance of the vehicle can be further improved.

While the first-fifth reinforcing members 91-95 of the above-described embodiment are formed as the partitioning member, these may be formed in a boxy shape. That is, adjacent flanges which extend in an extensional direction of each closed cross section from peripheral edge portions of the partition wall portion which partitions each closed cross section in a direction crossing the extensional direction of the closed cross section may be mutually joined or integrally formed so as to be continuous. Herein, the above-described configuration of the adjacent flanges being mutually joined or integrally formed so as to be continuous includes a case where the adjacent flanges are made integrally and another case where separately-made flanges are joined together by joining means.

That is, the corner portion which is made of the partition wall portion and the adjacent flanges extending from the peripheral edge portion of the partition wall portion is not limited to the one which is configured merely by straight-line bending, but any corner portion which is made of at least three faces or any corner portion which has curved or bent ridgelines. Thus, since the reinforcing member is formed in the boxy shape, the rigidity of the reinforcing member is improved more, compared with the partitioning member, so that the rigidity of the closed cross section provided with the reinforcing member can be improved more effectively. Thereby, the rigidity, in the vertical direction and in the vehicle width direction, of the suspension housing is more improved, so that the NVH performance of the vehicle can be further improved.

Figure 10:
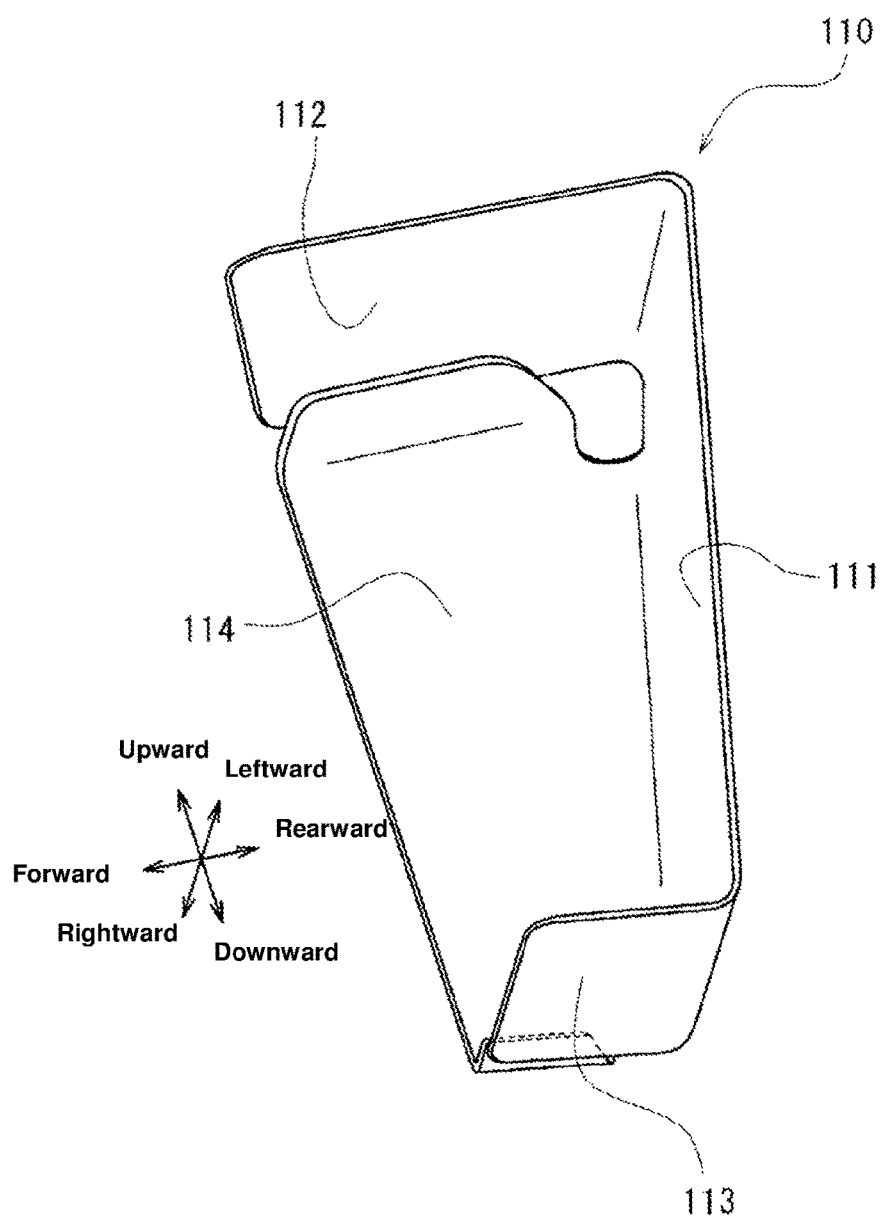
FIG. 10 is a perspective view showing a first reinforcing member according to a modification.

A modification of the first reinforcing member 91 will be described referring to FIG. 10. As shown in FIG. 10, a first reinforcing member 110 according to this modification comprises a partition wall portion 111, and an upper face portion 112, a lower face portion 113 and an outward face portion 114 which extend forward respectively from an upper end portion, a lower end portion, and an outward end portion, in the vehicle width direction, of the partition wall portion 111. The upper face portion 112 and the outward face portion 114 are joined together such that they are continuous to each other at their adjacent edge portions. The lower face portion 113 and the outward face portion 114 are joined together such that they are continuous to each other at their adjacent edge portions. Thereby, the first reinforcing member 110 of the modification is configured in the boxy shape such that it has a corner portion which is made of three faces of the upper face portion 112, the outward face portion 114, and the partition wall portion 111 and another corner portion which is made of three faces of the lower face portion 113, the outward face portion 114, and the partition wall portion 111, so that the rigidity can be improved effectively.

Herein, the first reinforcing member 110 of the modification is configured such that the upper face portion 112, the lower face portion 113, and the outward face portion 114 are respectively joined to the upper face portion 33, the lower face portion 34, and the side face portion 35 of the rear apron reinforcement 32 from the cross-section inward side.

The present invention should not be limited to the above-described embodiments, and any other modifications or improvements may be applied within the scope of a spirit of the present invention.

What is claimed is:

1. A front vehicle-body structure of a vehicle, comprising:
   a hinge pillar extending in a vehicle vertical direction;
   an apron reinforcement connected to an upper portion of the hinge pillar and extending forward;
   a suspension housing joined to the apron reinforcement in front of the hinge pillar;
   a side sill, positioned on a forward side of the hinge pillar, connected to a lower portion of the hinge pillar and extending rearward;
   a connecting member directly connecting the apron reinforcement to the hinge pillar in a brace shape and connecting the apron reinforcement to a front portion of the side sill,
   said connecting member includes a front face portion, a rear face portion, a side face portion which connects the front face portion and the rear face portion,
   the side face portion is an outer surface in a vehicle width direction,
   a gap exists between the side face portion and another outer surface of the hinge pillar, and
   a front bend is positioned between the front face portion and the side face portion, said front bend extends in a direction away from said connecting member, and the apron reinforcement and the side sill are connected to each other via said front bend.

2. The front vehicle-body structure of the vehicle of claim 1, wherein
   the apron reinforcement has a closed cross section and a first reinforcing member is provided to longitudinally partition an inside of said closed cross section of the apron reinforcement,
   the hinge pillar has a closed cross section and a second reinforcing member is provided to extend obliquely forward and upward and obliquely partition an inside of said closed cross section of the hinge pillar at the lower portion of the hinge pillar,
   the side sill has a closed cross section and a third reinforcing member is provided to longitudinally partition an inside of said closed cross section of the side sill,
   a lower end portion of said first reinforcing member and an upper end portion of a rear bend that is positioned between the side face portion and the rear face portion are positioned so as to be continuous to each other inside and outside the apron reinforcement,
   a lower end portion of said rear bend and an upper end portion of said second reinforcing member are positioned so as to be continuous to each other inside and outside the hinge pillar, and
   a lower end portion of said second reinforcing member and an upper end portion of said third reinforcing member are positioned so as to be continuous to each other inside and outside the side sill.

3. The front vehicle-body structure of the vehicle of claim 2, wherein said rear bend and said second reinforcing member are configured to have substantially the same angle relative to a horizontal direction in a vehicle side view.

4. The front vehicle-body structure of the vehicle of claim 3, wherein a front face portion of the hinge pillar includes a joint face portion to which the lower end portion of said rear bend and the upper end portion of said second reinforcing member are joined, and said joint face portion is configured to be substantially perpendicular to said angle of said rear bend and said second reinforcing member.

5. The front vehicle-body structure of the vehicle of claim 2, wherein said first reinforcing member, said second reinforcing member, and said third reinforcing member are a partitioning member, respectively.

6. The front vehicle-body structure of the vehicle of claim 3, wherein said first reinforcing member, said second reinforcing member, and said third reinforcing member are a partitioning member, respectively.

7. The front vehicle-body structure of the vehicle of claim 4, wherein said first reinforcing member, said second reinforcing member, and said third reinforcing member are a partitioning member, respectively.

8. The front vehicle-body structure of the vehicle of claim 1, wherein a fourth reinforcing member which longitudinally partitions an inside of the hinge pillar is further provided at the hinge pillar, and said fourth reinforcing member is located substantially at the same level as a lower end portion of said rear bend.

9. The front vehicle-body structure of the vehicle of claim 2, wherein a fourth reinforcing member which longitudinally partitions an inside of the hinge pillar is further provided at the hinge pillar, and said fourth reinforcing member is located substantially at the same level as a lower end portion of said rear bend.

10. The front vehicle-body structure of the vehicle of claim 7, wherein a fourth reinforcing member which longitudinally partitions an inside of the hinge pillar is further provided at the hinge pillar, and said fourth reinforcing member is located substantially at the same level as a lower end portion of said rear bend.

11. The front vehicle-body structure of the vehicle of claim 8, wherein said fourth reinforcing member is a partitioning member.

12. The front vehicle-body structure of the vehicle of claim 9, wherein said fourth reinforcing member is a partitioning member.

13. The front vehicle-body structure of the vehicle of claim 10, wherein said fourth reinforcing member is a partitioning member.

14. A front vehicle-body structure of a vehicle, comprising:
a hinge pillar extending in a vehicle vertical direction;
an apron reinforcement connected to an upper portion of the hinge pillar and extending forward;
a suspension housing joined to the apron reinforcement in front of the hinge pillar;
a side sill connected to a lower portion of the hinge pillar and extending rearward;
a connecting member connecting the apron reinforcement to the hinge pillar in a brace shape and connecting the apron reinforcement to a front portion of the side sill,
a wheel house that exists in front of said connecting member and below the apron reinforcement,
said connecting member includes a front face portion, a rear face portion and a side face portion which connects the front face portion and the rear face portion,
the front face portion constitutes a part of said wheel house,
a front bend which is positioned directly between the front face portion and the side face portion, said front bend extends in a direction away from said connecting member.

15. The front vehicle-body structure of the vehicle of claim 14, wherein said front bend is in an arc shape along said wheel house.

16. The front vehicle-body structure of the vehicle of claim 14, wherein said front bend is formed by bending the side face portion in a vehicle width direction.

17. The front vehicle-body structure of the vehicle of claim 14, wherein said rear bend is bent inward in a vehicle width direction.

* * * * *